Sept. 20, 1949. R. L. ARRINGDALE 2,482,233
TELESEISMIC DETECTING, SIGNALING, AND RECORDING
Filed March 28, 1946 4 Sheets-Sheet 2
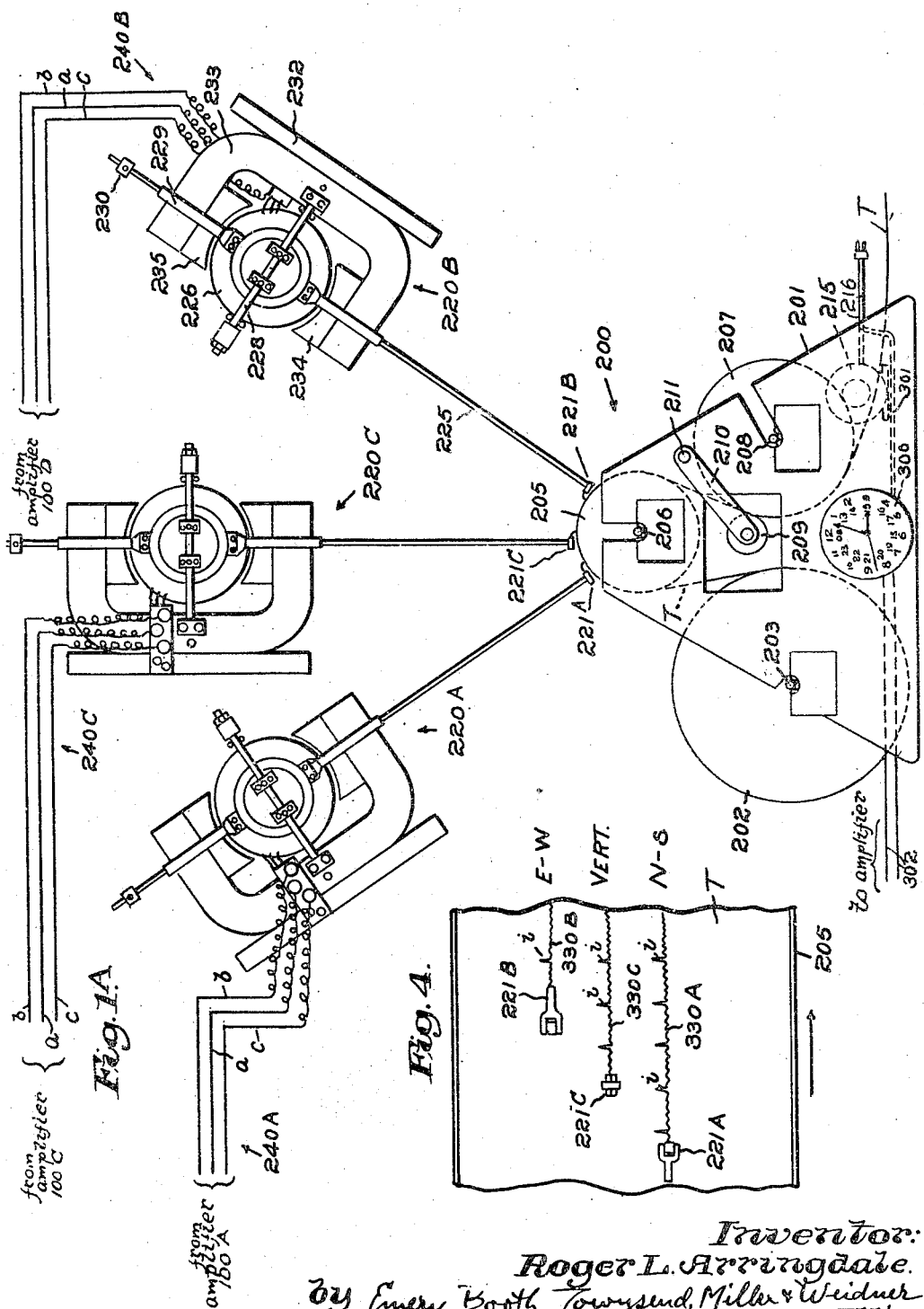

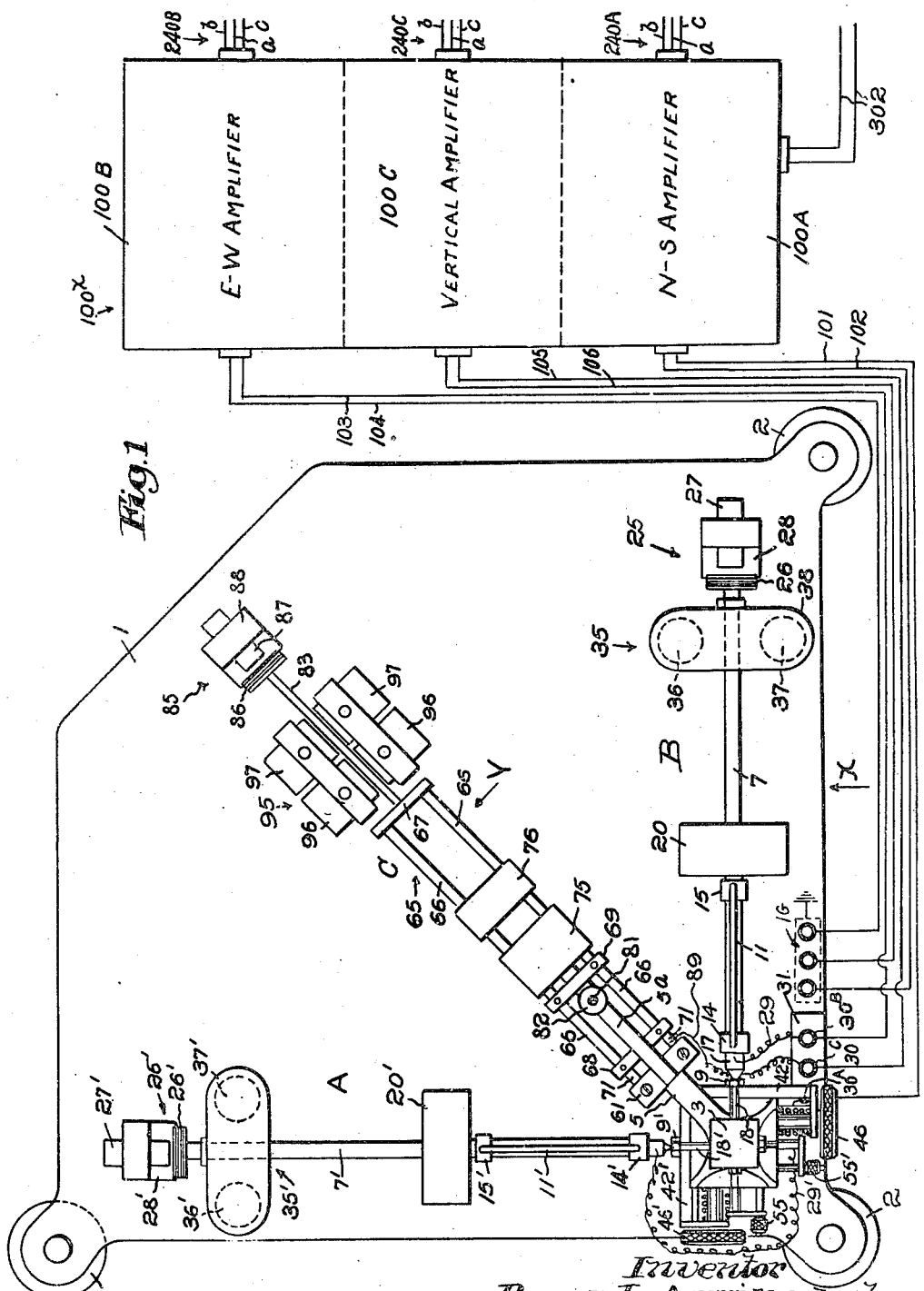

Sept. 20, 1949.  R. L. ARRINGDALE  2,482,233
TELESEISMIC DETECTING, SIGNALING, AND RECORDING
Filed March 28, 1946  4 Sheets-Sheet 3
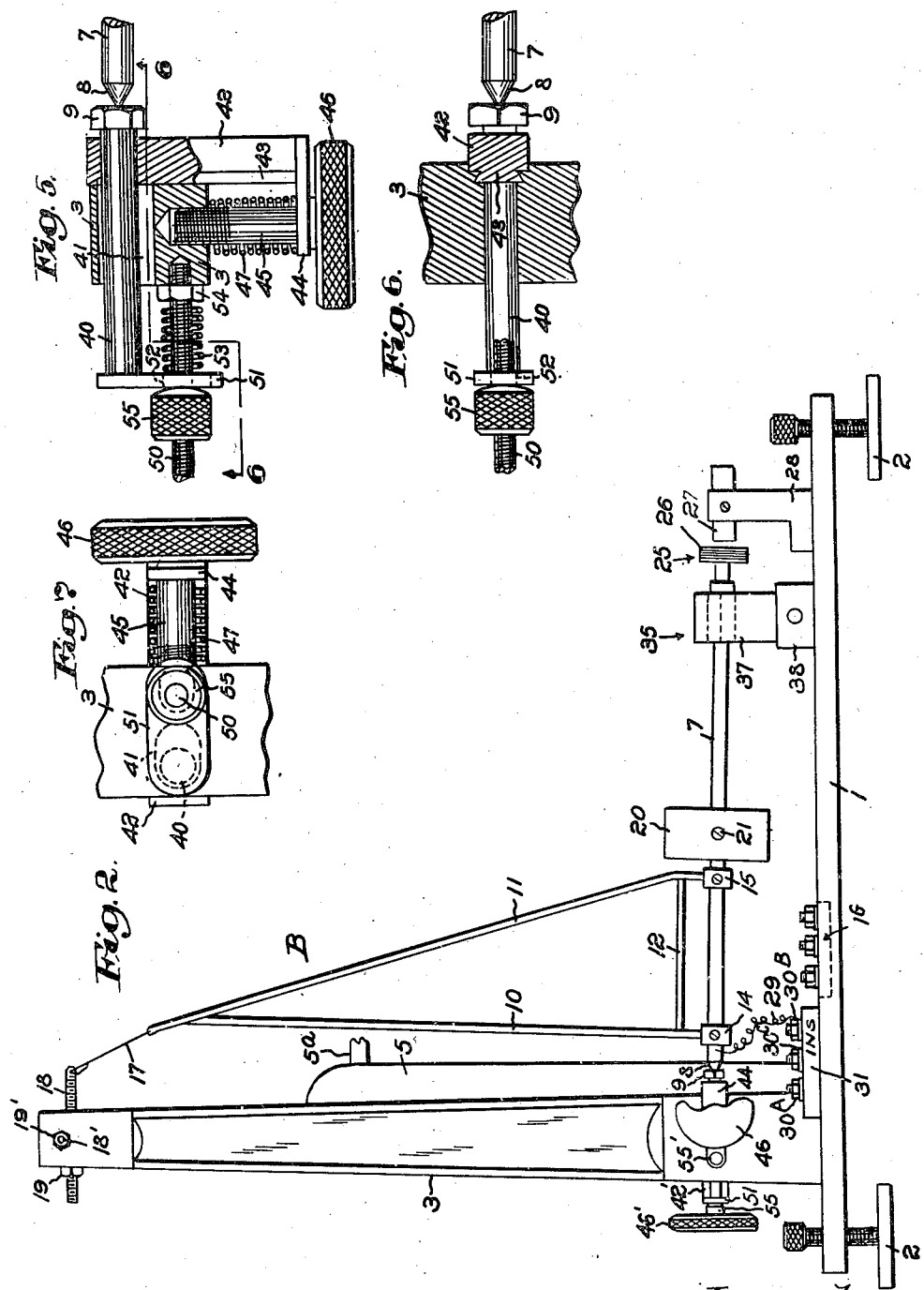
Inventor:
Roger L. Arringdale,
by Emery, Booth, Townsend, Miller & Weidner,
Attys

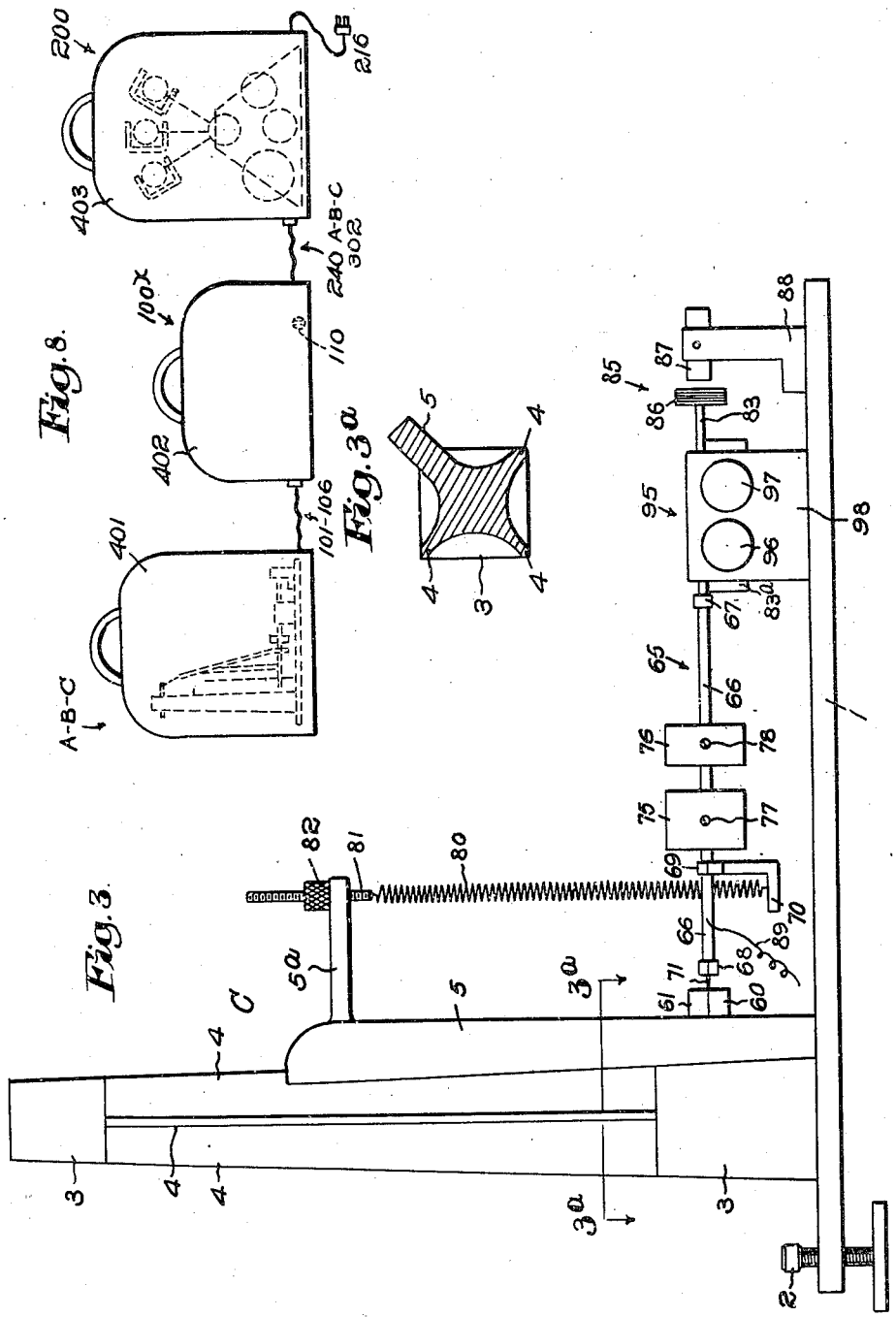

Patented Sept. 20, 1949

2,482,233

UNITED STATES PATENT OFFICE 2,482,233

TELESEISMIC DETECTING, SIGNALING, AND RECORDING

Roger L. Arringdale, Wakefield, Mass., assignor to Diamond Instrument Company, Wakefield, Mass., a corporation of Massachusetts Application March 28, 1946, Serial No. 657,698

6 Claims. (Cl. 177—352)

This invention relates to the detection, measurement and recording of seismic disturbances and especially with respect to long-period shock waves and teleseisms. It aims to provide simple, efficient and otherwise improved apparatus and methods for the purpose and includes among its important objects the provision of a seismograph which is compact and of relatively light weight, such that it is readily manually portable for use in different locations.

In the drawings, illustrating by way of example one embodiment of the invention, and whereby the methods thereof may be practiced:

Figs. 1 and 1A together illustrate somewhat schematically a portable long-period seismograph, the Fig. 1 portion of said illustration being in plan, and the Fig. 1A portion in elevation;

Fig. 2 shows in elevation one of the horizontal component elements, in this case that at the lower portion of Fig. 1, as if looking in the direction of arrow X placed below said figure;

Fig. 3 is an elevational view similar to Fig. 2 showing the vertical component element, as if looking in the direction of arrow Y of Fig. 1;

Fig. 3A is a horizontal sectional view through the column;

Fig. 4 is a fragmentary plan view of a portion of the record strip;

Figs. 5, 6 and 7 are detail views upon a larger scale of certain levelling devices associated with the horizontal components of Figs. 1 and 2; and Fig. 8 is a partly diagrammatic assembly view upon a small scale of the several units of a portable long-period seismograph embodying the invention.

Referring first to Figs. 1, 2 and 3, these show one example of the initial detecting and transducing unit of the seismograph of the invention, including a plurality of seismometer components responsive to a like number of different aspects of the earth-borne movements concerned, together with amplifying means for the signals deriving from each component. This initial unit comprises a platform 1 of general rectangular outline and equipped with levelling means shown as a plurality of supporting legs 2 threaded for vertically adjustable engagement with corner portions of the platform. The weight is predominantly at one main corner area, that at the lower left in Fig. 1, making it possible to avail of the adjusting ease and other advantages of a three-point support, the legs 2 being herein located at said main corner and at the two laterally adjacent corners.

Mounted in upright position at said main corner area or apex of support of the platform is a single column 3 which herein constitutes a common support for the plurality of seismometer elements to be described. Three such elements appear in Fig. 1. One of these is shown separately in Fig. 2 and another in Fig. 3. Each of them is herein suspended on and from the one column 3. These seismometer elements are individually designated generally at A, B, and C in Figs. 1 to 3. Seismometers A and B, disposed along the mutually perpendicular side portions of the platform at which the legs 2 are located, are for detecting and metering two relatively perpendicular horizontal components of the shock waves or teleseisms. These horizontal components may be termed generally the longitudinal and the transverse components, with reference to the direction along the earth surface from the point of origin, or they may be identified by geographical directions. Seismometer A for example may be for the north-south component and seismometer B for the east-west component, or vice versa, depending on the orientation of the apparatus. Seismometer C, herein arranged in the angle between the other two and mounted on the same column 3 therewith, is for the vertical component of the particular teleseism. These elements are suspended operatively from the column in angular relation thereto and to each other in the same lateral or horizontal plane, which passes through the column near the base thereof.

The platform 1 with the seismometer elements A, B and C is adapted for use at any selected location, geographically speaking. At the particular station it is placed on a firm earth-supported base such as an integral rock outcrop or a concrete block embedded in the ground, the platform being accurately levelled as by the means described. The platform may be a unitary plate of substantial strength and rigidity and in the interest of portability may be of a light-weight material such as magnesium, aluminum or one of their alloys. Similarly the supporting column 3 is a rigid upright member desirably of an integral structure adapted to maintain steady perpendicular relation to the platform, subject to the same earth-transmitted movements as the latter.

In the illustrated example the column 3 is of a generally rectangular and herein square cross-sectional form as seen in plan in Fig. 1, preferably with a slight upward taper from a solid base portion firmly anchored to the platform. An intermediate portion of the column may be longitudinally channeled, between vertical ribs 4 at the column corners, Figs. 1 and 3A, making for lightness while retaining adequate rigidity. The column as noted is set at a corner area of the platform 1, with one corner diagonal of the column in substantial line with the 45° diagonal of the platform at that corner. At the inner medial corner, along the line of said diagonal, the column includes an integral or solidly joined vertical flange 5 at which the vertical component C of the apparatus is supported, as will be more fully described. While the column may be variously dimensioned, in a typical embodiment of the readily portable apparatus of the invention the height above the platform level generally need not exceed about 18 to 24 in.

The plurality of component seismometer elements A, B and C present the relatively inert portions of the apparatus. Through the medium of the single column 3 they are herein all related in a common manner to the earth-supported portion, comprising mainly the platform and said column. It is the movement of that earth-supported portion of the apparatus under the influence of the teleseisms which is to be compared with the relatively inert status of the seismometer components A to C, as the indication and measure of the teleseisms. And since these components A to C are commonly supported from the one column 3 of the earth-supported portion, the three directional components into which the vibrational effects are broken down are simultaneously detected with maximum accuracy and in their true relation as characteristics of the given teleseism. In other words the plurality of components A, B and C are at any one instant all operatively referred to a single locus on the earth's surface.

The two horizontal or longitudinal and transverse components A and C, for descriptive convenience referred to as N-S and E-W, are similar in structure and arrangement and may in general duplicate each other in mutually perpendicular relation. A description of one of them accordingly will suffice for an understanding of the invention. To facilitate reference to Fig. 1 I have selected the E-W component B for separate illustration in Fig. 2, the latter an elevational view as if looking at the Fig. 1 apparatus in the direction of the arrow thereon. Corresponding parts of the N-S component A have the same reference numerals on the drawing as for component B, with the addition of a prime mark.

Noting particularly Fig. 2 and referring also to Fig. 1, the typical horizontal component of the invention comprises a beam 7 in the form of a cylindrical or other metallic rod having at its inner or supported end a conical fulcrum formation 8 centered in a jewel bearing 9. As will be more fully described with reference to Figs. 5 to 7 the beam 7 and its fulcral bearing means are herein provided with plural-directional sensitive adjusting mechanism.

The beam 7 is suspended by a truss-like frame comprising generally upright rods 10 and 11. These converge upwardly in the vertical plane containing the beam axis and meet at an acute angle at their upper ends, where they are rigidly joined. One of the rods, herein the outer and more inclined rod 11, is extended beyond the juncture point. Near their lower ends the rods 10 and 11 desirably are reinforced as by a strut 12 connected at one end to the rod 10 and at the other end to a straight terminal portion of the rod 11. These rods 10 and 11 terminate downwardly in bearing collars 14, 15 respectively received on the beam 7 and adapted to be fixed in different adjusted position along it as by means of set screws or the like as indicated.

At the upper end of the truss element 10, 11 is a relatively short flexible link 17 having its lower end connected to the extended portion of the rod 11 as by looping through an aperture therein. The upper end of this link 17 is similarly attached to a stud 18 adjustably threaded into or through the top portion of the column 3 and locked in adjusted position as by a nut 19. This flexible link 17 of a length which is but a minor fraction of the column height, desirably is formed of a stainless steel or comparable metal wire or other strand of relatively fine gauge but high tensile strength.

The described end-fulcrumed beam 7 with its truss 10, 11 and flexible link 17 constitutes means for freely suspending upon the column 3 a calculated mass 20 such that the beam as a whole is afforded a marked inertia. This mass 20, shown as a block, is horizontally apertured substantially centrally for reception on the beam 7 with capacity for adjustment along it subject to securing as by a set screw or the like 21. The mass 20 is set at such position along the beam, and the bearing 9 and attaching link 17 are so adjusted that the beam as a whole assumes a general horizontal position, substantially as in Fig. 2.

At the outer or free end of the beam 7 remote from its fulcrum 9 there is mounted a transducer means indicated generally at 25. In the partly diagrammatic example the transducer is shown as a coil 26 of extremely fine electrically conductive wire, the coil being fixed coaxially at the end of the beam 7. Disposed in inductive relation to the coil is a permanent bar magnet 27 adjustably held as by a set screw in a rigid supporting bracket 28 firmly anchored on the supporting platform 1.

It will be understood that under the influence of teleseisms relative movement effective in the horizontal plane is set up as between the beam 7 and transducer 25, on the one hand, and the earth-supported portion of the apparatus on the other hand; said earth-supported portion comprises the column 3, the platform 1 and particularly also in this connection the magnet 27 and the bracket 28 rigidly connecting it to the platform. Such relative movement induces an electro-motive force in the transducer coil 26, this force of relatively low order being transmitted through suitable electrical connections to the E-W amplifier 60 diagrammatically illustrated in Fig. 1. For example, one end of the transducer coil 26 may be grounded to the beam 7, the other end being connected by an insulated wire 29 extending along or through the beam 7 to the binding post 30B of a group thereof carried by an insulating block 31 on the platform. The corresponding conductor 29' of the N-S component A connects to post 30A of the group.

The transducer 25 shown in the form of a relatively movable coil and magnet may be of any known or preferred type including those availing of a variable reluctance, a variable capacity or of a piezo-electric function. Similarly the associated electric circuit feeding to the amplifier may be modified for operation with transducer means involving variation of inductance, resistance or capacity as well as one in which current is generated as in the example selected for illustration.

Considering still the horizontal components A and B of Fig. 1, and the Fig. 2 showing of the E-W component B, the respective beams 7 and 7' desirably have damping means associated with them. For this purpose I have herein illustrated magnetic dampeners designated generally at 35 and 35'. These are represented as permanent magnets each comprising two legs 36, 37 and 36', 37' vertically disposed on bases 38, 38' fixed on the platform 1 and preferably adjustable relative to it in the direction lengthwise of the corresponding beam 7 or 7'. These beam-damping magnets 35, 35', which may be other than of the permanent type, are set with the line of centers of their legs at right angles to the corresponding beam axis. The beams respectively extend through between the magnet legs, centrally thereof under normal inactive conditions, and are thus subject to the damping influence of the associated magnetic field.

Further in accordance with the invention the horizontal components A and B are associated with the common supporting column 3 in such manner that the beam 7 or 7' of each component is subject to horizontal positional regulation in two directions, namely, lengthwise in the line of the beam axis and crosswise in the horizontal direction perpendicular to the beam axis. As to each of the beams 7 and 7' the two bodily shifting adjustments may be accomplished each independently of the other. Means for this purpose is shown in detail in Figs. 5, 6 and 7 to which reference is now made, as well as to Fig. 1 and Fig. 2. The two-directional adjustment for each beam 7 and 7' is duplicated with respect to each of them, as will be apparent in Fig. 1. For the sake of clearness the adjusting means for but one of the means is shown in Figs. 5 to 7, in this instance that for the E-W component B, the one shown separately in elevation in Fig. 2.

Noting Figs. 5 and 6, the jewel bearing 9 for the fulcrumed end of the beam 7 is fixed at the end of a movable bar 40 extending through an enlarged transverse recess 41 in the column 3. This recess is horizontally dimensioned to permit the bar 40 to be bodily shifted transversely in parallelism with itself and in a horizontal direction at right angles to the vertical axis of the column 3, to an extent affording the desired range of adjustment in that direction for the bearing 9. The movable bar 40 is slidably guided and supported at its end adjacent the bearing 9 in a cross-slide 42 having a dove-tailed or other undercut guide portion 43 received in a like-shaped way extending horizontally across the side face of the column 3 opposite the beam 7. The slide 42 is thus fixed relative to the column in the direction lengthwise of the beam but is guided for movement in the general horizontal plane perpendicular to the beam axis.

At the end of the cross-slide 42 remote from the bar 40 is a laterally projecting finger 44 apertured for passage of a regulating screw 45. The latter is adjustably threaded into a tapped aperture for the purpose in the column 3, at the side wall thereof which faces the observer in Fig. 2. The regulating screw 45 has a thumb-wheel 46 at its outer end, beyond the projecting finger 44 of the cross-slide 42. A coil spring 47 surrounding the screw 45 and bearing between the finger 44 and the adjacent face of the column 3 urges the slide 42 together with the bar 40 and the beam bearing 9 on the latter in the horizontal direction toward the observer in Fig. 2. Turning of the thumb-wheel 46 in the direction to enter the screw 45 into the column 3 shifts the slide 42, bar 40 and bearing 9, consequently also the beam 7 as a whole, horizontally in said direction and against the spring. Similarly, opposite turning of the wheel 46 provides for opposite horizontal adjustment of the beam, under the influence of the spring 47. If preferred the screw 45 and the finger 44 of the slide 42 may be interconnected, as by an annular groove in the screw receiving the finger, for positive movement in both directions, the spring then serving to avoid any play between them.

For bodily adjusting the beam 7 in the direction lengthwise of its axis there is provided at the vertical face of the column 3 opposite the beam bearing 9 a threaded stud 50. This extends in general parallelism with the beam and with the movable bar 40. An integral or other plate-like finger 51 on the adjacent end of the bar 40 has an elongated recess as at 52 for free passage of the stud 50 and to allow for the previously described lateral adjustment of the bar 40. A coil spring 53 surrounds the stud 50 and bears between the finger 51 and the column 3 or an anchor nut 54 on the stud. Thus the finger 51, the bar 40 and the beam bearing 9 thereon are urged in a horizontal direction to carry the bearing toward the column 3. An adjusting nut 55 is threaded onto the projecting portion of the stud 50 beyond the finger 51, the nut having a rounded inner face for contact with the finger 51. Turning of the nut 55 in one or the other direction shifts the bar 40 longitudinally thereof and with it the beam bearing 9. Thus the beam as a whole is bodily adjusted in the axial direction, toward or away from the vertical axis of the supporting column 3.

As noted, the regulatory positioning of the given beam 7 or 7', in the two mutually perpendicular directions in the horizontal plane may be effected each independently of the other. Further, the thread formations of the transverse adjusting screws 45, 45' and of the longitudinal adjusting studs 50, 50' are of a pitch selected to provide for precision setting by increments of any desired degree of fineness. It will be apparent that the transverse adjustments, by the thumb-wheels 46 and 46' bodily shift the corresponding beam with respect to the true vertical through its suspension point 18 or 18' at the top of the column 3. Similarly, the longitudinal or axial adjustments by the adjusting nuts 55 and 55' accomplish bodily adjustment of the seismometer beams relative to said true vertical but in a horizontal direction at right angles to the other adjustment. The two adjustments are intimately related and together regulate and control with extreme accuracy the amplitudes and the periods of relative horizontal deviation for the respective seismometer beams 7 and 7'.

Referring now to the element C, responsive to the vertical component of the earth-transmitted teleseisms, this element is seen in plan in Fig. 1 and separately in side elevation in Fig. 3. As evident in Fig. 1 it is compactly disposed centrally of the two horizontal components A and B, substantially at the 45° angle between them. While in some instances the vertical component may be separately supported, in the preferred embodiment of the invention and as herein illustrated, it is mechanically related to the earth-supported portion of the apparatus by means of one and the same supporting column 3 from which the two horizontal components are suspended.

Accordingly the column 3 includes the vertically extending flange 5 previously mentioned, projecting at that corner portion of the column which is enclosed between the horizontal components A and B. Near the base of the column 3 the flange 5 has integrally or otherwise affixed a transverse block 60 on which is releasably secured as by screws or the like a clamping strap 61. The parts 60 and 61 together provide a fulcrum and pivotal support for the vertical component C as a whole. The main beam of this element is indicated generally at 65. It herein comprises a pair of horizontally spaced rods 66, 66' having their outer ends secured to a cross-piece 67. The two rods 66, 66' are rigidly interconnected at their inner ends by a horizontally divided two-part strap or clamp 68 and at an intermediate point by a similar cross-member 69 the underpart of the latter having an integral dependent L-shaped foot or bracket 70, Fig. 3. The upper and lower sections of these cross-connections 68 and 69 are releasibly interconnected as by screws or the like affording capacity for adjustment of the relative spacing of the rods 66, 66' which together comprise the major part of the beam 65.

This beam 65 of the vertical component C is flexibly connected at its inner end to the bearer block 60, 61 in a manner providing for relative movement in the vertical plane as between the beam 65 and the earth-supported portion of the apparatus under the influence of the teleseisms. The flexible pivotal connection as herein shown comprises a plurality of relatively thin horizontally disposed strips 71, 71' of metal or other material of a non-frangible character. These flexible strips 71 together with the block and strap members 60, 61 form fulcral supporting connection as between the beam 65 and the column 3, through the flange 5 thereof. Accordingly the earth-supported column 3 and platform 1 have capacity for vertical movement relative to the beam 65, under the influence of the teleseisms.

The described beam 65 of the vertical component C includes means whereby it is made relatively inert in the absolute sense, that is, with reference to the surrounding space. For this purpose I have shown in Figs. 1 and 3 a composite mass including a main portion or block 75 and a secondary or auxiliary mass 76. These two masses may be solid or other blocks of substantial density and of a weight calculated and proportioned with respect to the length of the beam 65. They preferably are slidably mounted on the beam members 66 and 66' and secured in selected position of adjustment along them as by set screws 77, 78.

Suspension of the beam 65 with maximum independence in the vertical plane is afforded herein by means of an elongated vertical coil spring 80 having its lower end secured to the horizontal portion of the dependent foot 70 on the members 66 and 66' of the beam. At its upper end the spring 80 is fixedly connected to the lower end of a threaded stud 81 vertically held in the outer end of a horizontal arm 5a rigidly extending from the upper part of the vertical flange 5 of the column 3. An adjusting nut 82 on the stud 81 above the supporting arm 5a, whereby the stud and spring may be raised or lowered, provides for regulating the beam position in the vertical plane. It is noted that the spring 80 is of substantial length and has suspending attachment to the beam 65 below the center of mass, thus making for maximum freedom and stability for the beam 65. The spring not only affords support against gravity for the steady mass comprised in the beam 65 and blocks 75, 76, but also furnishes restoring force, aided or opposed by gravity, in the event of displacement of the mass.

The beam 65 of the vertical component C, referring again to Figs. 1 and 3, includes at the outer end a terminal portion or rod 83 extending centrally from and beyond the cross-piece 67, in line with the longitudinal axis of the beam 65 as a whole. Transducer means for this beam is provided, of any preferred type as already described in connection with seismometer elements A and B. In Figs. 1 and 3 the transducer is indicated generally at 85. It is represented similarly as for the horizontal components and herein includes a coil 86 coaxially mounted at the outer end of the beam extension 83 in spaced opposition to a permanent magnet 87 on a supporting bracket 88 on the platform 1. As for the other components, one end of the coil is grounded, the other end being connected by a conductor 89 to the binding post 30C of the set of three thereof on the insulating block 31, Figs. 1 and 2.

Likewise the vertical component C is equipped with dampener means, in this instance effective primarily in the vertical plane. Such means indicated generally at 95 in Figs. 1 and 3 may be generally similar as for the horizontal components but with the permanent or other magnet members 96, 97 horizontally disposed on a supporting base 98 on the platform 1. A plate 83a of armature material secured to the end rod 83 of the beam 65 stands vertically in the magnetic flux path between the poles of the magnet members 96, 97, similarly as corresponding horizontal armature members for the beams 7 and 7'.

From the foregoing it is evident that individual electric signals conformant to the different components of the influencing teleseisms are available from each of the seismometers A, B and C by means of the respective transducer circuits. Each such circuit includes a coil-connected conductor 29', 29 or 89 extending to the corresponding binding posts 30A, 30B or 30C of the group on the insulation 31. The other side of each transducer coil, being grounded to its supporting beam 7, 7' or 65 and hence to the platform 1, is accessible at one of the set of three binding posts 1G, Figs. 1 and 2, in electrical contact with the platform 1 as indicated by the dotted rectangle and grounding symbol on Fig. 1.

The signals originating in the transducer circuits being of a relatively low order of power are fed to suitable amplifier means as diagrammatically indicated at 100A, 100B and 100C in Fig. 1 for the N-S, E-W and the vertical components A, B and C respectively. These if desired may be permanently assembled either with the Fig. 1 seismometer section of the apparatus or with the recorder section shown in Fig. 1A. For ease in handling it is found convenient to furnish the amplifier means as an individually portable unit 100X; see also Fig. 8.

The seismometer section is electrically connected to the amplification unit 100X by appropriate wiring which may be contained in a cable with plug-in or like detachable connections at either or both ends. The wiring includes for each of the seismometer circuits a pair of leads extending to the corresponding amplifier 100A, 100B or 100C. One lead of each pair runs from one of the insulated binding posts 30A, 30B or 30C and the other from one of the set of posts 1G grounded on the platform 1. On Fig. 1 the lead pairs are designated respectively at 101, 102 for the N-S amplifier 100A, at 103, 104 for the E-W amplifier 100B and at 105, 106 for the vertical amplifier 100C.

From the amplifier unit 100X the signal output at the higher power level is transmitted to the recording unit of the apparatus, Figs. 1A, 4 and 8. As there shown, the recorder assembly designated generally at 200, is constituted as a separable unit readily portable with the other section or sections of the seismograph apparatus as a whole.

An important aspect of the invention lies in the provision of a seismograph record or seismogram on which the individual record tracks for each of the plurality of seismometer components are made simultaneously and in visually juxtaposed position on a single recording medium. Further, the record vehicle is of relatively inexpensive and easily available material, as compared with photographic or sensitized film heretofore in use, and is such that the recorder may be furnished with a supply adequate for continuous recording over relatively long periods, such as several days or even a week or more, before replenishment is required. The associated recorder mechanism likewise is adapted for continuous automatic operation without attention from an operator. Moreover, the transcription of record may be had directly at the detecting location where the seismometer and amplifying units of the apparatus are set up or at any convenient more or less remote point, through wired or other electrical transmission.

In the preferred form and as herein represented the record-receiving medium is a continuous strip or tape T of paper or other fibrous or paper-like material, such as an inexpensive grade of paper as used in telegraphic tickers and other business machines. This paper record tape T may be relatively narrow, generally not more than about 3 to 6 inches or thereabouts, depending on the number and lateral spacing of the plurality of separate side-by-side tracks such as represented on Fig. 4.

The recording unit as illustrated in Figs. 1A and 8 comprises a supporting frame or housing 201 on which the several elements of the recording means are compactly assembled. These include mechanism for supporting and continuously advancing the record tape T past individual recording instrumentalities responsive to the corresponding seismometer components A, B and C. The recording tape desirably is supplied in the form of a roll 202 rotatably supported on the frame as at 203. From the roll supply 202 the tape T passes in supporting contact about a revolving platen or drum 205 rotatably carried on the frame as at 206. The tape T is advanced to and past the recording station at the platen 205 by rotary feed means including a feed wheel or drum 207 on a driven shaft 208 and having a cooperating follower roll 209 between which and the driven wheel 207 the tape passes in feeding relation. The follower 209 has pressing contact with one face of the tape opposite the feed wheel 207, being yieldably and rotatably mounted on one or more arms 210 pivoted on the frame as at 211.

The tape T carrying the plural-component seismographic record is continuously delivered from the recorder unit as at the lower right in Fig. 1A where it may be rewound or otherwise collected as by being accumulated into a basket or other receiver. The feed means 207 is adapted to be continuously driven at a predetermined constant rate as by means of a small electric motor 215. This may be of the synchronous type such as used in electric clocks, energy being supplied from any available power source as through a plug-in connection 216.

The several marking or recording instruments are each designated generally in Fig. 1A at 220A, 220B and 220C respectively. They are in the nature of galvanometer-operated marking or inking devices. Each comprises a marker, stylus or pen 221A, 221B, 221C of any preferred self-supplying, continuous marking or fountain type. To simplify the description the component parts of but one of these galvanometer-controlled markers will be described and numbered, that at the right in Fig. 1A, namely the marking element 220B, for the E-W component B. It will be understood that the corresponding parts of the other units 220A and 220C may be the same.

This inking or other marking instrument 221B is carried at the free end of an elongated marker arm 225 projecting radially from a coil 226. The coil is mounted to swing about a diametral axis perpendicular to the marker arm 225, on a supporting cross-shaft 228 having anti-friction bearings on a fixed part of the unit. At the side of coil 221 opposite the marking arm 225 and in alignment with the latter is an arm extension 229 carrying an adjustment counter-balance 230.

The typical marking unit further comprises a carrying base or bracket 232 supported in any convenient manner on or adjacent the recorder housing 201 to present the marker unit in operative relation to the rotary platen 205 and the record tape T passing over it. The galvanometer base 232 has fixed on it a permanent or other field magnet 233, illustrated as of U-shape and having pole pieces 234, 235 at diametrally opposite sides of the coil 226 rotatably suspended between them. Under the influence of the electrical signals from the corresponding amplifier, in this particular case the amplifier 100B of Fig. 1, the coil swings in one or the opposite direction about the axis of its supporting shaft 228 and oscillates the marking instrument 221B in the direction transversely of the record tape T, that is, toward and from the viewer looking at Fig. 1A. By reason of the mechanical advantage of the elongated marker arm 225 relatively minute swinging motions of the coil are magnified in the resulting record track such as represented on Fig. 4.

While in the illustrated example the marker means is represented as a galvanometer-like device it will be understood that the electro-mechanical translation of the amplified signals superinduced by the transducer may be effected by any preferred means, including for example reversible electric motors operatively connected to the axes of the marker arms and receiving the signals transmitted from the amplifier.

Each of the marker units 220A, 220B and 220C of whatever form is adapted for electrical connection with the corresponding amplifier unit so as to receive the amplifier seismometer signals transmitted from it. The connections, which may be by means of a multi-conductor cable with plug-in connection, include for each marker unit a set of three leads designated generally at 240A, 240B, 240C, Figs. 1 and 1A. Each such set of three leads comprises a common wire $a$, a wire $b$ providing therewith a circuit for the amplified seismometer signals and a wire $c$ forming with the common line $a$ a circuit for impulses from a timer.

The timing impulses may be imposed directly at the recorder but for convenience in organization of the apparatus as a whole and consistent with the desired portability they are fed into and through the respective amplifiers 100A, 100B and 100C. The timer may be located with any section of the apparatus but desirably and as illustrated is incorporated with the recorder of Figs. 1A and 8. As herein shown it comprises an electric clock 300 supplied from and synchronized with the same source as for the motor, conveniently through the same plug-in connection 216. This timing clock is constructed and arranged to impart an electrical impulse or variation periodically, as for example each minute through a pair of leads 302 extending to the amplifier unit 100X and there having parallel connection with each of the individual amplifier sections 100A, 100B and 100C. From the amplifier 100X these time-indicating signals are transmitted in amplified form to the respective galvanometer 220A, 220B and 220C through the circuits comprised by the leads a and c of the triple series 240A, 240B and 240C already described.

In the enlarged fragmentary plan view of Fig. 4 there is shown a short length of the paper record tape T as it travels at a constant rate beneath the marking instruments or pens 221A, 221B and 221C in the direction of the arrow at the bottom of Fig. 4. There the individual record tracks as transcribed in response to the signals from the three seismometer elements A, B and C, are indicated at 330A, 330B and 330C. In each of the tracks the time-indicating jogs formed in response to the operation of the timer means are indicated at $i$. Noting the right-hand portion of Fig. 4, it will be seen that the same instant in time is simultaneously indicated for each of the record tracks, the time jogs $i$ for each of them being directly in alignment transversely of the tape T and the several tracks are in such proximity that a comparative visual reading of any and all of them, for any instant in time, is readily had. The respective record tracks are individually identified by their characteristic location upon the paper record. Merely by way of example the vertical component is herein shown as applying its track substantially centrally along the tape as at 330C, with the tracks for the two horizontal components closely spaced at either side of the vertical track. In the illustrative example the N-S component has its track below as at 330A and the E-W component above the central track as at 330B. Preferably the tracks are also visually differentiated as by different colors of the ink or other marking medium, for example the three tracks reading from top to bottom in Fig. 4 may be green, red and black or whatever distinctive color may be preferred for the particular directional component.

In Fig. 8 my portable long-period seismograph such as described in connection with the preceding figures is represented on a reduced scale in its condition as readied for carrying, except that the plug-in cable connections between the respective units or sections of the apparatus generally will be disengaged for transport. The seismometer unit A—B—C is furnished with a removable covering container 401 equipped with convenient handle means. Similarly the amplifier section or unit 100X has a carrying container 402, while the recorder unit 200 including the tape record supply, the translating elements or pens and the timer, is likewise portably housed in a cover or container 403.

Any suitable form of housing carriers for the seismograph units may be employed. In the example of Fig. 8 the cases 401, 402 and 403 are represented as of transparent plastic material shaped and proportioned to accommodate the respective units. The amplifier unit 100X desirably is arranged for operation either from a built-in battery power source or from an outside power source when such is readily available at the selected geographic location, a power inlet connection being indicated at 110 in Fig. 8. This alternative self-contained and plug-in power arrangement desirably also is provided for the recorder unit 200, the electric energy for which may be supplied from the same power-pack which serves the amplifier unit 100X while the plug-in connection for an outside power line is indicated at 216, Figs. 1A and 8. The connecting cable between the amplifier and the recorder units 100X and 200, the cable designated by the arrow and associated wiring numerals 240A—B—C and 302 in Fig. 8, may also carry the connecting leads for the power supply, whether the latter is from a self-contained or an outside source.

While in the drawings I have shown but one recording unit or station, it will be understood that by reason of the power amplification of the low-power signals derived from the set of seismometer elements, one and the same set of the latter may be employed to operate any desired plurality of recorders located either at the same or different stations including one or more stations more or less remote from the detecting and transmitting location; also that the transmission may be via wired or radio transmitting means.

From the foregoing it is evident that my disclosed invention novelly provides a compact and relatively inexpensive yet highly efficient manually portable plural-component seismograph capable of detecting and recording teleseisms. The apparatus is adapted for hand carrying to any selected place of operation. As there set up it functions automatically and with a minimum of attention, so that over continuous periods of a week or more it need be visited only when it is desired to examine the record. The medium on which the record is transcribed, being a paper or like inexpensive flexible tape, makes for marked economy in operation. Since the rate of tape travel at the recorder may be relatively slow, generally in the order of about 30 mm. per minute, a supply of the tape for a continuous 24-hour operation (approx. 140 ft. at the rate noted) costs but a few cents even at current prices in contrast with a cost of many times that amount for a photographic or sensitized strip record.

Moreover, the ink-marked paper tape record is immediately available at any instant for examination and study and may at all times be exposed to the normal light. Thus any necessity for operation of the seismograph in a dark room is avoided and the record may be viewed without having first to remove and develop or print it. Renewals of the record supply are called for only at relatively infrequent intervals, and at any time lengths of the record which may be of particular interest may be cut or torn from the accumulated continuous paper strip coming from the recorder. Since the time intervals are automatically indicated on the record by means of the timer jogs $i$, simultaneously for each of the plurality of juxtaposed record tracks of the several teleseimic components, the complete seismic history for any particular time may be at once visually determined from an inspection of the one conveniently handled record tape. This contrasts with the previous practice in which a number of separate records for two or more components required separate preparatory treatment and assembly before a comparative study of the different components could be made.

In addition to these and numerous other advantages which will be apparent from the foregoing description in connection with the drawings, the seismometer section of the apparatus novelly combines a plurality of detecting and transducing components upon a single supporting column, yet with full capacity for individual and relative plural-directional adjustment. While in some instances one of the components, as for example the vertical component, may be separately supported, preferably at least two of the components, generally the horizontal components including the longitudinal or N-S and the transverse or E-W, are thus commonly suspended on the single column while in the illustrated example all three components are afforded the common support, thus promoting faithful reproduction of the earth-borne vibrations as well as making for compactness and portability of the apparatus as a whole. It is here again emphasized that my apparatus is particularly adapted for long-period or teleseismic detecting and recording as contrasted with devices primarily designed and useful for only relatively short-period man-made or other vibrations such for example as those characteristic of prospecting operations.

My invention is not limited to the particular embodiments thereof illustrated and described herein by way of example, and I set forth its scope in my following claims.

I claim:

1. A plural-component manually portable teleseismic detecting, signalling and recording system including a single supporting column and a plurality of seismometer elements for a like number of different components, said elements being operatively suspended from said column in angular relation thereto and to each other in the same horizontal plane, which passes through the column near the base thereof.

2. A manually portable long-period teleseismic detecting, signalling and recording system adapted to record teleseisms, comprising a platform carrying an upright column and seismometer elements for mutually perpendicular horizontal components, said horizontal component elements suspended from and attached to the column as the common support therefor positioned on a common horizontal plane and in spaced angular relation to the column and to each other.

3. A plural component manually portable teleseismic detecting, signalling and recording system comprising upright supporting column means and a plurality of seismometer elements for a like number of different components, including two horizontal components and a vertical component, at least the two horizontal components being suspended from and attached to one and the same upright element of the column means in spaced angular relation thereto and to each other.

4. In seismographic apparatus, a seismometer column, a plurality of generally horizontal beams freely suspended on and by the column in teleseism-detecting relation thereto and at an angle to each other, and means for independently adjusting the vertical position of the beams relative to each other.

5. In seismographic apparatus, a seismometer column, a plurality of generally horizontal beams freely suspended on and by the column in teleseism-detecting relation thereto and at an angle to each other and means for independently adjusting at least one of the beams either and both transversely and longitudinally.

6. Seismograph apparatus comprising, in combination, a seismometer assembly including a base, a single column on and rigid with the base, seismometer elements operatively suspended on the column in angular relation thereto and to each other in the same horizontal plane, which extends through the column near its base for respectively detecting longitudinal, transverse and vertical teleseismic components, each element having a transducer for effecting electrical variations signalling relative movement of the column and the particular element, amplifier means in circuit with the transducers to receive and amplify the respective signals therefrom, recording means presenting a continuously movable record strip, a marker device for each seismometer element adapted to trace upon the record strip, and electrical actuating means for each marker device adapted to receive the amplified signals from the seismometer elements and to translate them into mechanical movement of the corresponding marker devices.

ROGER L. ARRINGDALE.

REFERENCES CITED

The following references are of record in the file of this patent:

UNITED STATES PATENTS

| Number | Name | Date |
| --- | --- | --- |
| 1,579,877 | McDonnell | Apr. 6, 1926 |
| 1,951,358 | Hayes | Mar. 20, 1934 |
| 2,055,476 | Blau | Sept. 29, 1936 |
| 2,074,043 | Blau et al. | Mar. 16, 1937 |
| 2,184,313 | Owen | Dec. 26, 1939 |
| 2,267,356 | Ritzmann | Dec. 23, 1941 |
| 2,276,423 | Silverman | Mar. 17, 1946 |
| 2,286,386 | Silverman | June 16, 1942 |
| 2,328,222 | McCarty | Aug. 31, 1943 |
| 2,390,328 | Roberts | Dec. 4, 1945 |

OTHER REFERENCES

Engineering, April 13, 1923, pp. 474–477.
Bulletin of the Seismological Society of America, Oct. 1939, pp. 550–556.